United States Patent [19]

Rene

[11] Patent Number: 4,866,588

[45] Date of Patent: Sep. 12, 1989

[54] CIRCUIT FOR SUPPRESSION OF LEADING EDGE SPIKE SWITCHED CURRENT

[75] Inventor: Raymond Rene, Morristown, N.J.

[73] Assignee: American Telephone and Telegraph Company AT&T Bell Laboratories, Murray Hill, N.J.

[21] Appl. No.: 311,999

[22] Filed: Feb. 17, 1989

[51] Int. Cl.[4] .......................................... H02M 3/335
[52] U.S. Cl. ........................................ 363/21; 363/56; 363/97
[58] Field of Search ................. 363/20, 21, 56, 78–80, 363/95, 97

[56] References Cited

U.S. PATENT DOCUMENTS 4,559,592 12/1985 Muller .................................... 363/21
4,623,960 11/1986 Eng ....................................... 363/21
4,672,518 6/1987 Murdock ............................... 363/21
4,761,702 8/1988 Pinard .................................... 363/56
4,791,546 12/1988 Carroll ................................... 363/97

Primary Examiner—Peter S. Wong
Attorney, Agent, or Firm—Alfred G. Steinmetz

[57] ABSTRACT

A switching mode converter with current mode regulation includes a passive network operative to waveshape a ramp signal in order to attenuate the leading edge spike of the sensed switch current. A passive pulse generating network generates a pulse in response to the generated ramp with the proper timing and polarity such that when superimposed on the sensed current waveform effectively cancels the leading edge spike of that waveform.

13 Claims, 3 Drawing Sheets

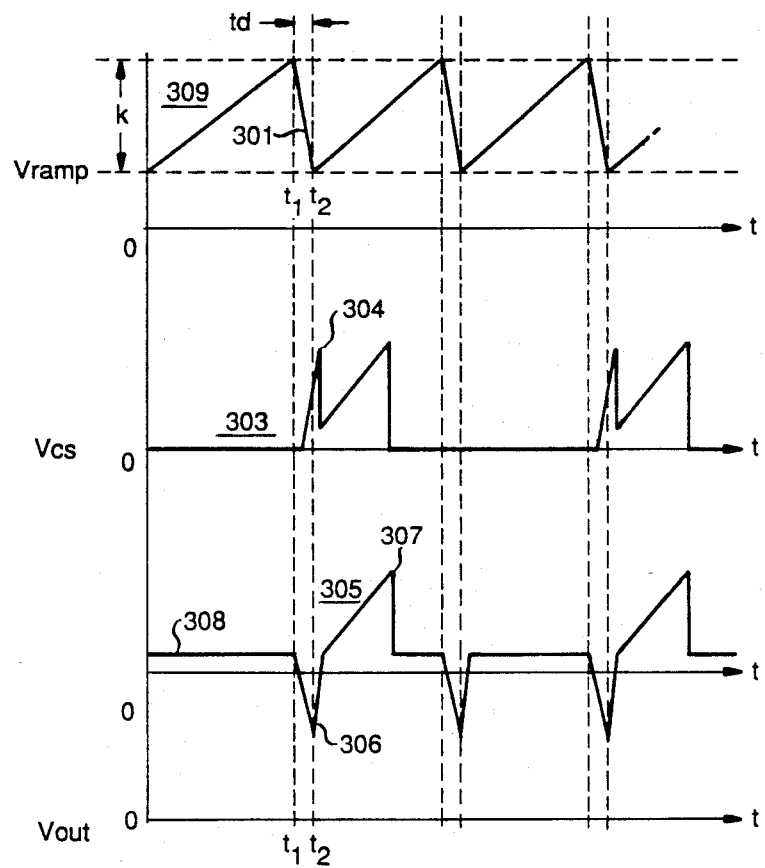

CIRCUIT FOR SUPPRESSION OF LEADING EDGE SPIKE SWITCHED CURRENT

FIELD OF THE INVENTION

This invention relates to switch mode converters and in particular to circuitry for suppressing the leading edge spikes of a switched current waveform of the converter.

BACKGROUND OF THE INVENTION

Switching power converters regulate by controlling the duty ratio of a power switch that couples the power from a source to a load. In one regulatory process current flowing through the power switch during the ON cycle is monitored by sensing apparatus in series with the power switch. Due to the inductive loading of the converter the current waveform has an increasing ramp. When the ramp waveform attains a predetermined threshold value the power switch is biased OFF thereby regulating the output of the converter.

The waveform of the switched power current often contains a large spike at the beginning of the ramp waveform due to various parasitic reactances in the power converter. Such reactances may include leakage inductances and interwinding capacitances of the converter's power transformer and other component parasitic reactances. Since termination of the ON time of the power switch is based on the waveform attaining a threshold value the spike may cause premature termination of the ON time of the power switch if it attains that threshold value. Therefore the leading edge spike must be adequately suppressed to prevent premature termination of the ON time of the power switch. This danger is particularly high at light load where an amplitude difference between the leading and trailing edge of the current waveform is not significant. In these conditions the leading edge spike causes the power switch to be biased OFF causing the converter to exhibit subharmonic oscillations known as cycle skipping. This causes the converter to cease regulating and may cause the converter to emit audible noise.

Techniques of preventing the leading edge spike from prematurely terminating the ON time of the power switch have included passive networks such as low pass filtering circuits to block or shunt the high frequency initial spike and signal delay circuitry to momentarily inhibit the power switch turn-off bias circuit during the initial spike. These techniques may adversely affect the loop response of the regulation feedback loop and hence are undesirable for many applications.

An approach using an active network is shown in U.S. Pat. No. 4,672,518 which discloses a switching mode converter with current mode type regulation. An active circuit is included to improve the stability of operation over a wide range of load by altering a ramp signal applied to the comparator of the current mode control in response to load changes. This approach may not be suitable in applications where circuit cost is crucial.

SUMMARY OF THE INVENTION

A switching mode converter embodiment in accord with the invention includes a passive network operative to waveshape a ramp signal in order to attenuate the leading edge spike of the sensed switch current. A passive pulse generating network generates a pulse in response to the generated ramp with the proper timing and polarity such that when superimposed on the sensed current waveform effectively cancels the leading edge spike of that waveform.

In a preferred embodiment the passive pulse generating network is an RC network that differentiates a ramp pulse supplied by a control chip of the regulation circuitry and is connected to superimpose the differentiated signal on the sensed current signal.

BRIEF DESCRIPTION OF THE DRAWING

FIG. 3 shows signal waveforms occurring in the circuits of FIGS. 1 and 2.

DETAILED DESCRIPTION

Figure 1:
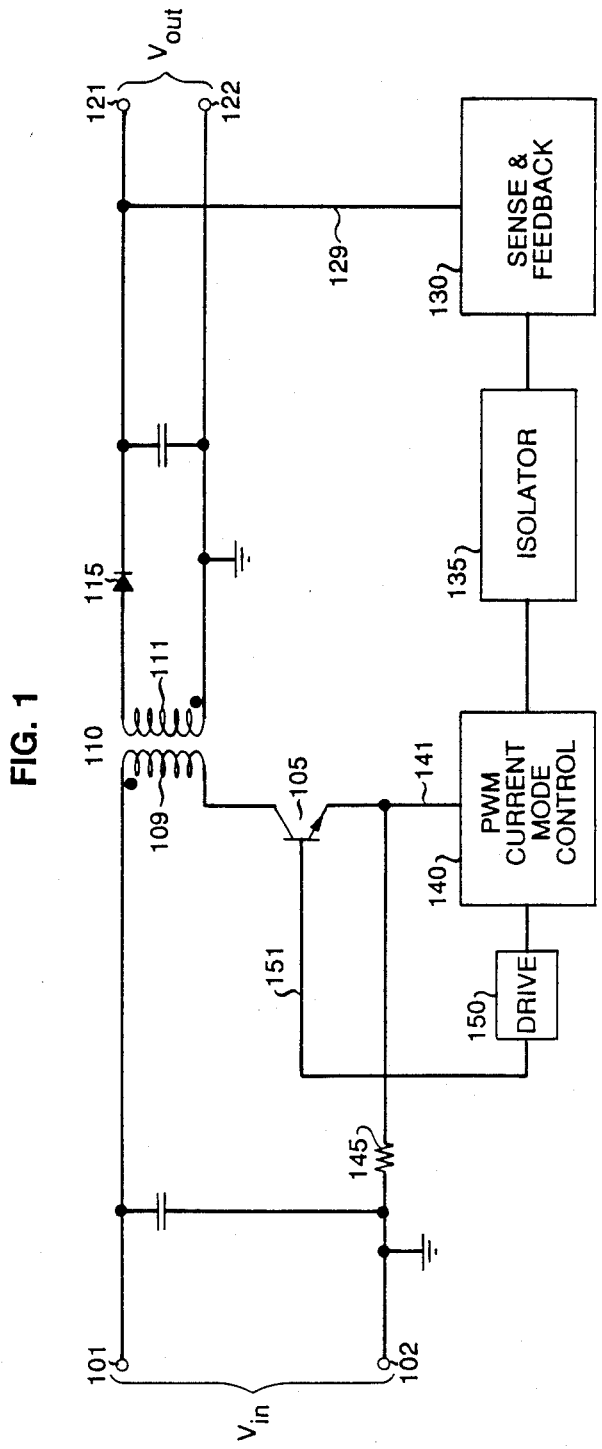
FIG. 1 is a schematic of a power converter embodying the principles of the invention.

A switching mode converter regulated by current mode control or peak current control regulation is shown in FIG. 1. This illustrative embodiment is a flyback type converter although it is to be understood that the invention is applicable to other types of converters. In the flyback converter of FIG. 1 a DC voltage is applied to the two input terminals 101 and 102. This DC voltage is coupled to the primary winding 109 of the power transformer 110 by the power switch 105. Energy is stored in the magnetizing inductance of the transformer by current flowing in the primary winding 109 when the power switch 105 is biased ON and conducting. This energy is discharged from the secondary winding 111 to the output terminals 121 and 122 during an OFF or non-conducting state of the power switch 105 when the rectifying diode 115 is biased conducting.

The duty cycle of power switch 105 is controlled in order to regulate the output voltage at output terminals 121 and 122. A sense and feedback circuit 130 is connected, via lead 129, to sense the output voltage at output terminal 121. An error voltage, representing a deviation of the output voltage from its regulated value, is generated and coupled, via a ground isolation network 135, to a PWM current mode control circuit 140 which is connected, via a drive circuit 150 and lead 151, to control the conductivity of the power switch 105. It periodically turns the power switch 105 ON. The current mode control circuit is connected, via lead 141, to sense a voltage drop across a current sensing resistor 145 connected in series with the power switch 105. The error voltage sets a threshold and when the voltage waveform (i.e. a ramp) across the current sensing resistor 145 exceeds the threshold voltage the power switch is biased OFF.

Figure 2:
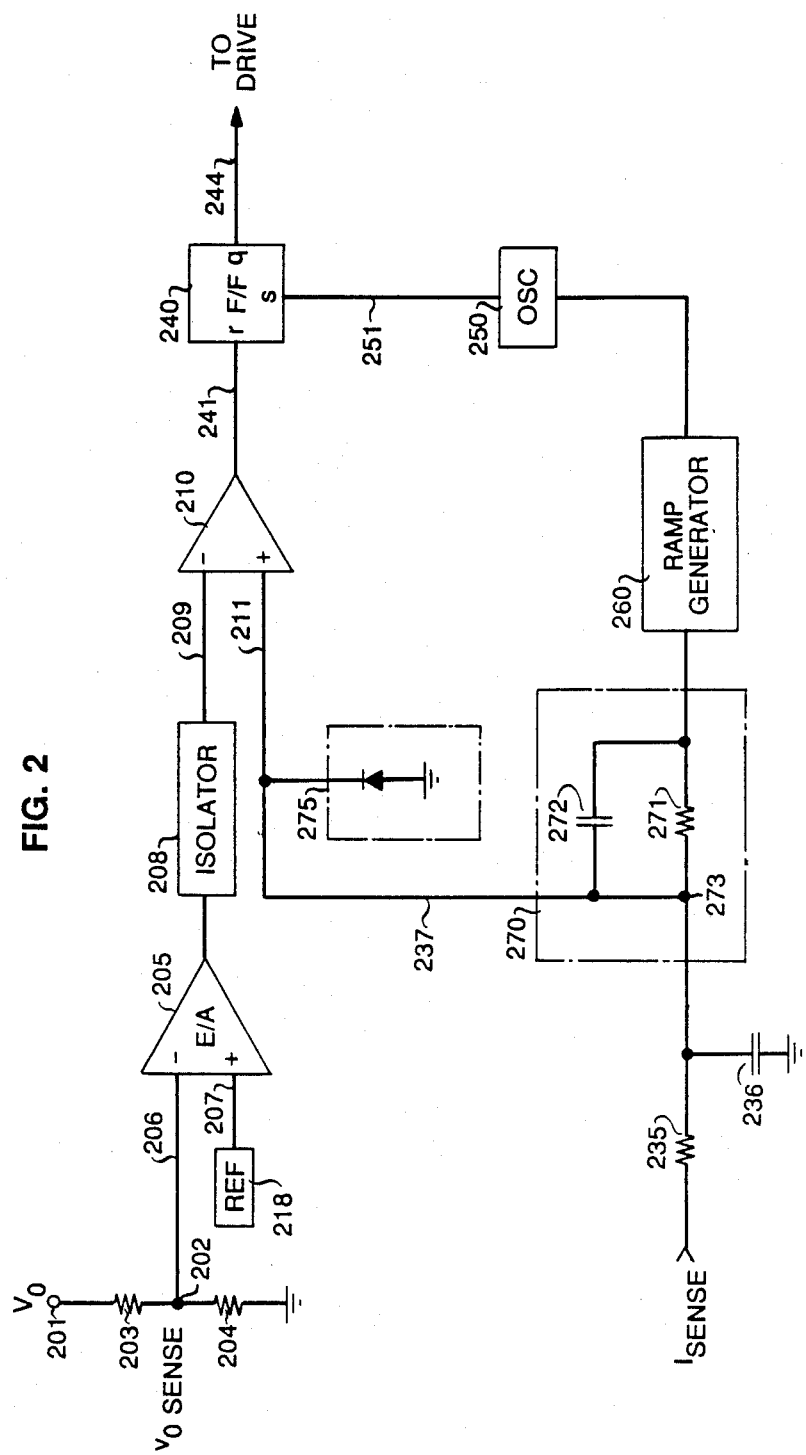
FIG. 2 is a schematic of a regulation controller used in the circuit depicted in FIG. 1.

As shown in FIG. 2, which discloses the regulatory control circuitry, the output voltage at terminal 201 is sensed at the center tap 202 of a voltage divider, comprising the resistors 203 and 204, in order to generate a scaled down voltage representative of the output voltage. This representative voltage is applied to the inverting input 206 of an error amplifier 205. A reference voltage 218 is applied to the non-inverting input 207. The error signal output of error amplifier 205 is applied, via an isolating circuit 208, to the inverting input 209 of a current sense comparator 210. The sensed current waveform is applied to the non-inverting input 211 of the current sense comparator 210. The comparator output is applied to the reset input 241 of a flip-flop circuit 240. The output of the flip-flop 240 on lead 244 controls the conductivity of the power switch.

The sensed current waveform is derived from the current sensing resistor 235 (resistor 145 in FIG. 1) and has a trapezoidal waveform due to the inductive loading of the power switch. The voltage across this resistor is coupled, via a filter capacitor 236 and lead 237, to the non-inverting input 211 of the comparator 210.

Periodic initiation of conduction of the power switch is controlled by an oscillator circuit 250 whose output on lead 251 periodically sets the flip-flop circuit 240 which supplies a drive signal on lead 244 to bias the power switch ON. The power switch remains on until the current waveform on lead 237 exceeds the error voltage on lead 209 and causes the output of the comparator 210 on lead 241 to reset the flip-flop circuit 240 and turn the power switch OFF.

Termination of the power switch ON time is in response to the trapezoidal current waveform attaining a predetermined threshold value determined by the error voltage input to the comparator 210 at input lead 209. Since the leading edge of the current sense waveform is likely to include a high peaked spike voltage which may exceed the error voltage input to the comparator 210; it may cause the power switch to be prematurely turned OFF. This initial spike may be due to many causes including transformer leakage inductance, transformer interwinding capacitance, diode switch recovery characteristics and other induced EMI due to circuit layout. If it is not effectively suppressed the initial spike of voltage prematurely terminates the ON time of the power switch. This problem becomes acute at light load because the amplitude difference and time interval between the initial spike voltage and the trapezoidal voltage waveform at the threshold voltage is very small. Under these conditions the action of the initial voltage spike in terminating conduction may induce subharmonic oscillations of the power switch causing the converter to cycle skip.

The leading edge spike voltage is suppressed by superimposing a generated signal on the filtered sensed current waveform to nullify any leading edge spike voltage it may include. The current waveform sensed across the current sensing resistor 235 is applied initially to a filter capacitor 236 and at node 273 a spike suppressing waveform is superimposed on the current waveform to suppress the voltage spike. This spike suppressing waveform is generated in response to the output of the oscillator 250 supplying a ramp at twice the frequency of its output which initiates the ON time of the power switch through the flip-flop circuit 240. Oscillator 250 drives a ramp generator 260 whose output is applied to waveshaping network 270 including a parallel connected resistor 271 and capacitor 272. The ramp waveform drives the waveshaping network at a frequency twice the converter switching rate. The wave shaping network differentiates the ramp to produce a voltage waveform which is superimposed on the sensed current waveform at node 273 and is operative to cancel the initial spike voltage. The waveform resulting from the summation is free of the initial voltage spike and is so applied to the non-inverting input 211 of the current comparator 210. While the generated ramp in the illustrative embodiment is twice the converter frequency, it is to be understood that a ramp generated at the converter frequency is equally suitable for practicing the invention.

An understanding of the invention may be readily attained by describing the operation of the circuit by referring to the signal waveforms of FIG. 3. Initially no current is flowing in the power switch prior to time $T_1$. At $T_1$ the output of the oscillator 250 triggers the ramp generator 260 initiating a negatively sloped ramp voltage waveform 301 at $T_1$ that extends to the time $T_2$. Simultaneously the oscillator 250 sets the flip-flop 240 generating a drive signal to initiate conduction in the power switch. The sensed current waveform 303 has an initial spike voltage 304 at the time of turn-on of the power switch. This spike voltage is generated in response to the circuit parasitics. This current waveform 303 is summed at node 273 with a pulse of opposite polarity derived from the negative slope waveform of the ramp signal 301 as differentiated by the waveform shaping network 270 producing the resultant current waveform 305 which has the initial spike voltage 304 replaced with a negative pulse voltage 306. This voltage waveform is applied to the non-inverting input 211 of the current comparator 210. After time $T_2$ the normal trapezoidal waveshape of curve 305 resumes its increasing shape, and termination of the ON time of the power switch occurs when the threshold voltage is reached at point 307 at the time designated by the voltage regulation requirements of the output voltage.

The negative extent of the summed current waveform must be limited to avoid exceeding the negative voltage capability of the current comparator 210. A diode clamp 275 is connected to the non-inverting input of comparator 210 to protect it from excessive negative voltage.

The offset level 308 of waveform 305 is due to differentiation of the positive sloped voltage of ramp 309.

While a specific embodiment of the invention has been disclosed many variations thereof will suggest themselves to those skilled in the art without departing from the spirit and scope of the invention.

I claim:

1. A power switching circuit, comprising:
   a power switch;
   circuitry for determining an ON time of the power switch, including;
   sensing circuitry for determining a sensed current flow through the power switch,
   comparison circuitry for comparing the sensed current flow with a control signal, and
   suppression circuitry for canceling sensed current spikes in the sensed current flow at the initiation of the ON time by generating an opposing pulse signal of a polarity opposite the sensed current flow coexistent with the current spike and summing the sensed current spikes and the opposing pulse signal prior to application to the comparison circuitry.

2. A power switching circuit as defined in claim 1, wherein the suppression circuitry comprises:
   a ramp generator;
   a signal differentiating circuit connected for generating a differentiated ramp signal from an output of the ramp generator, and
   means for summing the differentiated ramp signal with the sensed current flow through the power switch.

3. A power switching circuit as defined in claim 2, wherein the signal differentiating circuit comprises a parallel connected resistor and capacitor connected in series with the output of the ramp generator.

4. A power switching circuit, comprising:

an input for accepting an energy source;
an output for accepting a load;
a power switch for controlling energy flow from the input to the output;
a control for the power switch, including;
a sensing circuit for sensing current flow through the power switch as a proportional waveform,
a reference signal input,
a comparator for comparing the proportional waveform with the reference signal input,
a suppression network for canceling spike signals in the proportional waveform at the initiation of turn-on of the power switch prior to its application to the comparator by generating an opposite polarity pulse signal and summing it with an output of the sensing circuit.

5. A power switching circuit as defined in claim 4, wherein the suppression network includes a ramp generator synchronized with switching of the power switch and a circuit for differentiating a ramp output of the ramp generator whereby the output of the circuit for differentiating a ramp output is summed with an output of the sensing circuit.

6. A power switching circuit as defined in claim 5, wherein the circuit for differentiating includes a resistor and a capacitor connected in parallel.

7. A power switching circuit as defined in claim 6, wherein the sensing circuit includes a sensing resistor connected in series with the power switch.

8. A power switching circuit as defined in claim 7, and further including a voltage clamp at an input for accepting the proportional waveform of the comparator.

9. A switching mode converter, comprising:
a switch;
current mode regulation circuitry, including;
means for initiating conduction through the switch,
means for detecting a current waveform of a current in the switch, means for terminating conduction in the switch when the current waveform reaches a threshold value, and
means for negating initial spike voltages in the current waveform by generating a pulse of opposite polarity and concurrent with the initial spike voltage.

10. A switching mode converter as defined in claim 9 wherein the means for negating initial spike voltages includes a ramp generator synchronized with the means for initiating conduction through the switch;
means for differentiating an output of the ramp generator; and
means for summing an output of the means for differentiating with the current waveform.

11. A switching mode converter as defined in claim 10 wherein the means for differentiating includes a parallel resistive capacitive network.

12. A switching mode converter as defined in claim 11 wherein the means for detecting a current waveform of a current in the switch includes a current sensing means connected in series with the switch.

13. A switching mode converter as defined in claim 12 wherein the switch comprises a transistor switch.

* * * * *